March 25, 1941.   J. E. MILLER ET AL   2,236,108
CONCRETE PIPE
Filed April 6, 1940

Inventor:
Joseph E. Miller and
Paul L. Osweiler
By Robert L. Kahn Atty.

Patented Mar. 25, 1941

2,236,108

UNITED STATES PATENT OFFICE 2,236,108

CONCRETE PIPE

Joseph Edwin Miller, Oak Park, and Paul L. Osweiler, La Grange, Ill.

Application April 6, 1940, Serial No. 328,194

6 Claims. (Cl. 138—84)

This invention relates to reinforced concrete pipe and aims to provide concrete pipe suitably reinforced to withstand hydraulic pressures of as much as two hundred pounds per square inch and even higher. This invention aims to provide such a reinforced pipe section, the ends of which can withstand handling and can have gaskets applied thereto in connection with the formation of pipe line.

Referring to the drawing—

Figure 1:
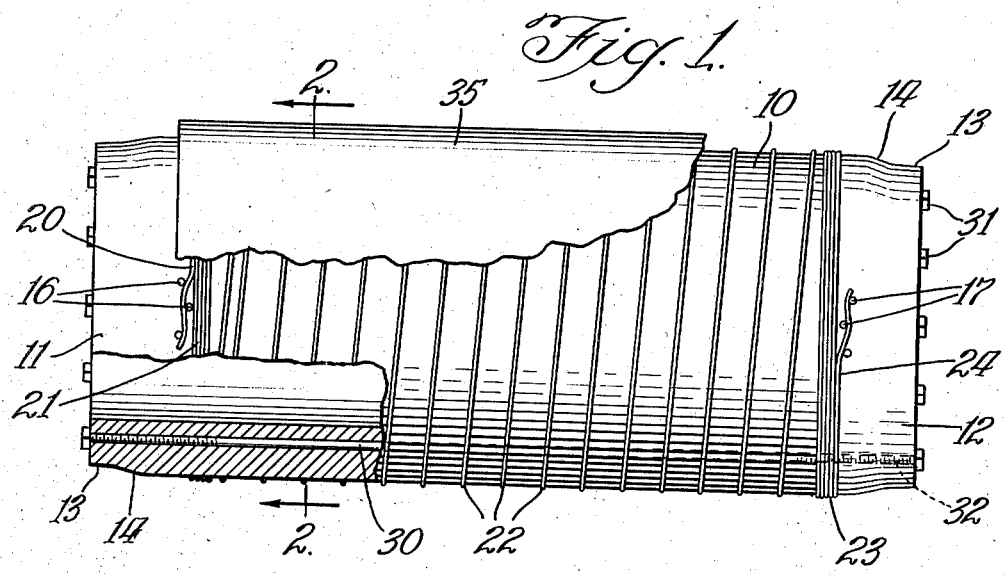
Figure 1 shows a reinforced pipe section with parts broken away.
Figure 2:
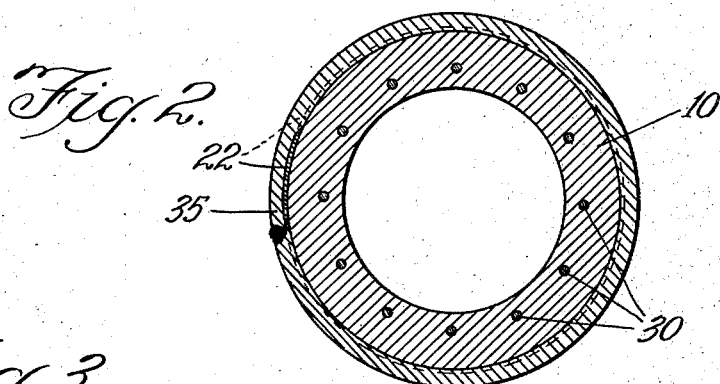
Fig. 2 is a section on line 2—2 of Fig. 1.
Figure 3:
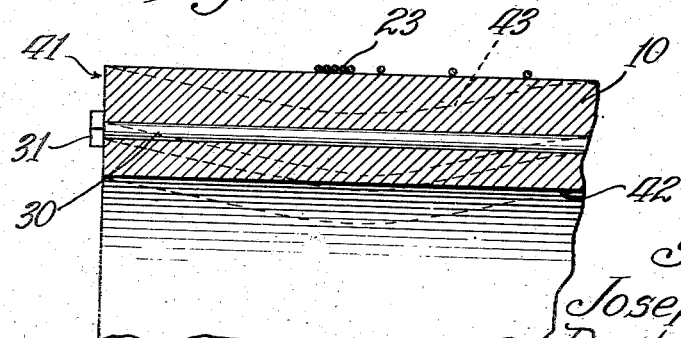
Fig. 3 is a sectional detail in highly exaggerated form, showing approximate stress conditions in the concrete near the end of the section.

A concrete pipe section 10 is made in any one of a number of well-known ways. This section is made of a "rich" mixture of concrete and should be aged to have a compressibility of 6,000 pounds per square inch or more before failing. Thus one mix may consist of one part cement to one and one-half parts sand and two parts gravel, all by volume, and mixed with a comparatively small amount of water. This mix is given merely by way of example since, as well known, the nature of the ingredients and manner of handling have a substantial effect on the characteristics.

The pipe section may be made in any desired size and length and in practice may vary from a wall thickness of about one inch and diameter of about eighteen inches to as much as eight or nine inches in wall thickness and diameter of over six feet. The length of each section may be any desired quantity and generally is of the order of about ten feet, although other sizes are common.

Each section is preferably, though not necessarily, provided with tapered ends 11 and 12 having a length of about four or six inches. The purpose of these tapered ends is to permit the use of unions having suitable gaskets between adjacent pipe ends to form a continuous pipe line. Each taper end has a gentle taper portion 13 at the very end and a more sharply tapered portion 14. The gentle taper is of the order of two or three degrees of arc while the sharp taper is of the order of twelve degrees. Other taper values may be used and only one type of taper may be provided at each end if desired. It is also possible to omit the taper entirely, although as pointed out later, the taper provides a desirable distribution of stress in the concrete as well as being desirable for union gaskets. As shown here, approximately half of the taper end is allotted to each taper value.

Suitably anchored in the pipe near the taper ends are suitable means to retain an end of a wire reinforcement. As shown here a group of pins 16 and 17 at each end is provided. One end 20 of a steel wire reinforcement is twisted around the pins 16 as shown. Several closely spaced turns 21 of the reinforcing wire are provided and then normal spaced turns 22 covering the greatest portion of the pipe length are provided. An end section 23 similar to 20 follows and then the terminal section 24 is twisted around the pins 17 to anchor the wire.

The wire used is steel and has an ultimate tensile strength of over 100,000 pounds per square inch and preferably a value as high as 150,000 or even 200,000. The wire is wound under tension of at least 60,000 pounds per square inch and preferably higher to tensions of the order of about 100,000 pounds per square inch. The wire tension may have a value of between 50% and 75% of the ultimate tensile strength. In this way, any sudden abnormal pressure surges when the pipe is in use will not strain the wire beyond its elastic limit. Under such conditions, a crack may appear in the concrete but upon normal pressure conditions, the concrete at the crack will heal together.

The wire may be wound on in any suitable manner such as by the machine disclosed and claimed in our Patent 2,175,479. The concrete pipe section is aged to a suitable degree prior to the application of the circumferential reinforcement. Thus, if desired, the ageing may be for a period corresponding to between 7 and 28 days at 70° F. in a moist atmosphere as set forth in our copending application Serial No. 193,976, filed March 4, 1938. Under such conditions, the compressibility of the concrete prior to failure will have developed to a high degree.

The spacing of the turns 22 may be easily determined by a simple calculation. The average compression in the concrete under these spaced turns should not exceed about 40% of the ultimate compressive strength of the concrete and preferably should be between 20 and 30% of this strength, although of course higher average compressions may be used if a smaller safety factor can be tolerated.

The average compression under the compacted turns 20 and 23 will be higher than in the body of the pipe and must not exceed the ultimate limit of the concrete. It is understood, of course, that under certain conditions, all the wire turns on the entire pipe section will be compacted to obtain the maximum reinforcement. In that case, the need for keeping within the limits of compressibility of the concrete still exists.

As a rule, the compacted reinforcing turns at the end perform two functions. For one thing, it is desirable to have closely spaced turns at the ends for the simple mechanical reason of building up a large frictional force along the wire sides tending to prevent unravelling of the wire. Then these compacted turns come at the ends of the full wall thickness and are followed by about four to six inches of tapered wall having no circumferential reinforcement. Since the thickness of the wall is a factor in computing the average compression in the concrete due to the wire turns, it is clear that any decrease in wall thickness will increase the average compression. For purposes of calculation, the stress lines due to the wire turns are considered as spreading uniformly in all directions through the concrete. Hence the high value of average compression under the compacted turns will result in some compression at the tapered ends. By tapering the wall thickness down, the average compression is maintained at a higher level than would be the case without tapering. In other words, the taper gives the effect of extending the wire reinforcement around the pipe nearer to the pipe end. This is quite important since high pressure pipe is useless if the ends are weak.

As a rule, the wire turns 22 may have from about one-half inch to as much as one and one-half inches space between adjacent turns while the compacted turns will range from three to six or eight turns. It is undesirable to have the wire turns spaced too far apart from each other since the assumption of pressure uniformity in the concrete will be strained.

A pipe section reinforced as above with wire turns only exhibits a so-called Poisson effect in the form of some circumferential yielding and pipe elongation. This pipe elongation may be as much as 25% of the direct displacement or yielding under the wire turns. Inasmuch as the wire tension is maintained by keeping the wire elongated or stretched, it is clear that any yielding of the concrete under the wire will permit the wire to shorten and destroy some of the tension. Hence longitudinal reinforcement of the pipe is essential.

To this end, a plurality of steel rods 30 are provided. These rods may be disposed within the pipe wall during the manufacture thereof. The rods are maintained in tension in any suitable manner such as by nuts 31 at the ends of the pipe.

The rods are tensioned so that the average longitudinal compression will just about neutralize or balance the Poisson effect. It is important not to overcompensate since the excess longitudinal compression acts like hydraulic pressure within the pipe and tends to neutralize the precompression of the concrete due to the wire coils. In theory, the hydraulic pressure is supposed to relieve the precompression of the concrete due to the wire coils. Thus, any excess of longitudinal compression of the concrete means that much less permissible hydraulic pressure to be safely handled by the pipe. In practice, a Poisson ratio of 20% may be assumed and thus the average longitudinal compression in the concrete may be about one-fifth of the average compression due to the wire coils in the body of the pipe and not at the compacted turns.

The number and size of longitudinal rods may vary within wide limits. Ordinarily, it is more economical to tension the rods to substantial values. Thus, 40,000 pounds per square inch for ordinary steel is a safe common value. It is desirable that the ratio of pipe wall thickness to rod thickness be kept at a safe value. Thus a ratio of at least five to one should be maintained. Furthermore, it is desirable that the rods be not more than about ten inches apart and preferably closer so that the continuity of compression due to the rods be preserved.

As far as the main body of the reinforced pipe section is concerned, it is immaterial, within wide limits, where the rods are located with reference to the inner and outer wall surfaces. However, the unreinforced end sections do require a definite wall zone within which the rods must be located. Due to the high compression of the concrete under the compacted wire turns and because the compression falls off at the circumferentially unreinforced pipe ends, it is necessary to locate the longitudinal reinforcing rods in a certain particular zone to prevent cracking of the concrete. We have observed that if the longitudinal rods have their centers disposed in a zone equal to about one-quarter of the pipe thickness extending inwardly from the wall center that all tendency for cracking disappears. The zone is measured on the wall of the body of the pipe section; i. e. at the full thickness. The precise location of the longitudinal rods within the zone may vary and depends upon the pipe characteristics.

An outer coating 35 of concrete may be applied to protect the steel wire from weather. This outer coating only covers the circumferentially reinforced part of the pipe section.

What is claimed is:

1. A reinforced concrete pipe comprising a cylindrical concrete pipe section of concrete aged prior to circumferential reinforcement to have an ultimate compressive strength of 6,000 pounds per square inch or more and having a plurality of tensioned reinforcing steel rods longitudinally thereof within the wall, said rods being spaced not more than about 10 inches from each other, and tensioned wire reinforcement circumferentially thereof at intervals of 2 inches or less, said wire being tensioned at least to 60,000 lbs. per square inch but within the elastic limit thereof, the spacing between adjacent wire turns and the wire size being such that throughout substantially all of the pipe section the average compression of the concrete is not more than 40% of the ultimate compressive strength, the tension, spacing and cross-section of the longitudinal rods being such that the average longitudinal compression of the concrete is of the order of 20% of the circumferential concrete compression.

2. A reinforced concrete pipe section comprising a cylindrical pipe section having a wall thickness of about 9 inches or less and having a plurality of longitudinal rods within the wall at spaced intervals and having a plurality of circumferential wire turns of reinforcement at spaced intervals throughout substantially all of the pipe length, said wire turns being tensioned at least to 60,000 lbs. per square inch but within the elastic limit thereof, the size of said wire and the spacing between adjacent turns being such that average compression of the concrete is not over 40% of the ultimate compressive strength, said longitudinal rods being tensioned and being spaced not more than about 10 inches apart and adapted to induce an average longitudinal compression in the concrete of the order of 20% of the average circumferential compression, said pipe section having the ends thereof free of wire turns for a distance of the order of 6 inches and having a plurality of the wire turns at the ends of the reinforced portion of the pipe closely spaced together with the compression in the concrete under such compacted turns lying within the limit of compressibility of the concrete, said longitudinal rods having their centers within a zone of the concrete wall beginning at the center of the wall thickness and extending inwardly toward the inner pipe wall for about one-quarter of the pipe wall thickness.

3. The pipe of claim 2 wherein at least a portion of the unreinforced ends of the pipe section taper in thickness, said taper tending to reduce the pipe wall thickness as the end face of the pipe is approached.

4. A reinforced concrete pipe comprising a cylindrical concrete pipe section of concrete aged prior to circumferential reinforcement to have an ultimate compressive strength of 6,000 pounds per square inch or more and having a wall thickness of about 9 inches or less and having a plurality of tensioned reinforcing rods longitudinally thereof within the wall, said rods being spaced not more than about 10 inches apart from each other, and tensioned wire reinforcement circumferentially thereof at intervals of about 2 inches or less, said wire being tensioned to between 60,000 and 180,000 lbs. per square inch but within the elastic limit thereof, the spacing and wire size between said wire turns being such that throughout substantially all of the pipe section the average compression of the concrete is between 20% and 40% of the ultimate compressive strength, the tension spacing and cross-section of the longitudinal rods being such that the average longitudinal compression of the concrete is of the order of 20% of the circumferential compression thereof.

5. The pipe section of claim 4 wherein the wire tension is substantially lower than the elastic limit thereof to leave substantial reserve elasticity therein to accommodate pressure surges of liquid within the pipe having a peak value in excess of the normal pressures to which the pipe is subjected during normal use.

6. The pipe of claim 4 wherein said longitudinal rods have a transverse dimension along the pipe wall thickness, which dimension is no larger than about one-fifth of said pipe wall thickness.

JOSEPH EDWIN MILLER.
PAUL L. OSWEILER.